(12) United States Patent
Cotter et al.

(10) Patent No.: US 6,478,142 B2
(45) Date of Patent: Nov. 12, 2002

(54) CONTACT ASSEMBLY FOR ACCUMULATION CONVEYORS

(75) Inventors: David H. Cotter, Coopersville, MI (US); Ronald C. Ehlert, Wyoming, MI (US); Thomas J. Pelak, Grand Rapids, MI (US); Kenneth J. Kooistra, Byron Center, MI (US); Curtis E. LeMay, Shelbyville, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 78 days.

(21) Appl. No.: 09/725,583

(22) Filed: Nov. 29, 2000

(65) Prior Publication Data

US 2001/0004959 A1 Jun. 28, 2001

Related U.S. Application Data

(63) Continuation-in-part of application No. 09/207,712, filed on Dec. 9, 1998, now abandoned.

(51) Int. Cl.$^7$ .............................................. B65G 13/06
(52) U.S. Cl. ................... 198/781.09; 198/806
(58) Field of Search ................. 198/781.03, 781.06, 198/781.09, 781.1, 781.11, 790, 806

(56) References Cited

U.S. PATENT DOCUMENTS

| | | | |
|---|---|---|---|
| 1,192,832 A | 7/1916 | Sherman | 98/416 |
| 1,292,178 A | 1/1919 | Waterman | |
| 1,321,303 A | 11/1919 | Haldeman | 198/415 |
| 1,487,000 A | 3/1924 | Williams | |
| 1,883,889 A | 10/1932 | Farley | 198/416 |
| 1,929,707 A | 10/1933 | Mojonnier | 198/137 |
| 2,190,418 A | 2/1940 | Davidson et al. | 271/52 |
| 2,566,417 A | 9/1951 | Holm | 198/31 |
| 2,586,523 A | 2/1952 | Dudley, Jr. | 198/30 |
| 2,706,034 A | 4/1955 | Russell et al. | 198/204 |
| 2,848,096 A | 8/1958 | Luginbuhl | 198/36 |
| 3,164,246 A | * 1/1965 | De Good | 198/781.09 |
| 3,240,311 A | 3/1966 | Hofer et al. | 198/34 |
| 3,241,651 A | 3/1966 | Colby | 198/31 |
| 3,255,865 A | 6/1966 | Sullivan | 198/127 |
| 3,306,430 A | 2/1967 | Fogg | 198/127 |
| 3,420,355 A | 1/1969 | Degood et al. | 198/127 |
| 3,420,356 A | 1/1969 | DeGood | 198/127 |

(List continued on next page.)

FOREIGN PATENT DOCUMENTS

| | | | | |
|---|---|---|---|---|
| DE | 0519810 | 2/1931 | | 271/52 |
| EP | 0198228 | 3/1986 | | |
| EP | 0727372 | 8/1996 | | |
| FR | 2248216 | 5/1975 | | 198/437 |
| JP | 0203023 | 9/1986 | | 198/436 |

Primary Examiner—Joseph E. Valenza
(74) Attorney, Agent, or Firm—Van Dyke, Gardner, Linn & Burkhart, LLP

(57) ABSTRACT

A contact assembly for an accumulation conveyor includes a support member having a cavity dimensioned to receive a force producing device. A contact member is positioned between the force producing device and the conveying rollers and reciprocates with respect to the conveying rollers. The contact member includes a wheel assembly which, when vertically reciprocated by the force-producing device, places the drive belt into driving contact with the conveying rollers. The wheel assembly is configured to move in a substantially transverse direction to the direction of movement of the drive belt to maintain alignment between the drive belt and the contact assembly.

69 Claims, 8 Drawing Sheets

U.S. PATENT DOCUMENTS

| | | | |
|---|---|---|---|
| 3,451,527 A | 6/1969 | Leach | 198/127 |
| 3,458,026 A | 7/1969 | Lauzon et al. | 198/34 |
| 3,458,339 A | 7/1969 | Miller et al. | 198/34 |
| 3,502,197 A | 3/1970 | Kato et al. | 198/127 |
| 3,508,642 A | 4/1970 | Standley et al. | 198/204 |
| 3,527,336 A | 9/1970 | Johnston | 198/127 |
| 3,580,379 A | 5/1971 | Shuster et al. | 198/31 AB |
| 3,601,240 A | 8/1971 | Dominici | 198/20 |
| 3,610,396 A | 10/1971 | Babunovic | 198/30 |
| 3,612,247 A | 10/1971 | Pipp | 198/37 |
| 3,612,248 A | 10/1971 | Wallis | 198/37 |
| 3,637,066 A | 1/1972 | Idskov et al. | 198/38 |
| 3,643,789 A | 2/1972 | Werntz | 198/127 |
| 3,666,077 A | 5/1972 | Marshall | 198/29 |
| 3,724,642 A | 4/1973 | DeGood | 198/127 R |
| 3,730,330 A | 5/1973 | DeGood | 198/127 R |
| 3,768,630 A | 10/1973 | Inwood et al. | 198/127 R |
| 3,770,102 A | 11/1973 | DeGood | 198/127 R |
| 3,840,109 A | 10/1974 | Kohl | 198/127 |
| 3,854,576 A | 12/1974 | Bowman | 198/184 |
| 3,866,739 A | 2/1975 | Sikorski | 198/30 |
| 3,880,298 A | 4/1975 | Habegger et al. | 214/11 R |
| 3,895,706 A | 7/1975 | Levin et al. | 198/127 R |
| 3,973,672 A | 8/1976 | Frost | 198/283 |
| 3,980,172 A | 9/1976 | DeGood | 198/781 |
| 4,039,074 A | 8/1977 | Maxted | 198/456 |
| 4,044,897 A | 8/1977 | Maxted | 214/11 R |
| 4,054,199 A | 10/1977 | Polderman | 198/452 |
| 4,054,201 A | 10/1977 | Rollinger | 198/455 |
| 4,074,805 A | 2/1978 | Bodewes | 198/790 |
| 4,088,224 A | 5/1978 | Kittredge | 198/781 |
| 4,103,769 A | 8/1978 | Jorgensen | 198/781 |
| 4,108,304 A | 8/1978 | McKnight et al. | 198/781.03 |
| 4,219,115 A | 8/1980 | Moore | 198/781 |
| 4,221,288 A | 9/1980 | Rae | 198/781 |
| 4,223,780 A | 9/1980 | Saur | 198/781 |
| 4,252,234 A | 2/1981 | Brouwer | 198/790 |
| 4,264,002 A | 4/1981 | Van Der Schie | 198/365 |
| 4,273,239 A | 6/1981 | Thwaites et al. | 198/781 |
| 4,284,186 A | 8/1981 | Brouwer | 198/415 |
| 4,293,065 A | 10/1981 | Dyer et al. | 198/781 |
| 4,301,914 A | 11/1981 | Krammer | 198/781 |
| 4,308,946 A | 1/1982 | Ouellette | 198/790 |
| 4,311,231 A | 1/1982 | Milazzo | 198/781 |
| 4,318,468 A | 3/1982 | Bodewes et al. | 198/781 |
| 4,353,458 A * | 10/1982 | Saur | 198/781.09 |
| 4,361,224 A | 11/1982 | Bowman | 198/781 |
| 4,361,225 A | 11/1982 | Saur | 198/781 |
| 4,372,441 A | 2/1983 | Krammer et al. | 198/781 |
| 4,441,607 A | 4/1984 | Bowman et al. | 198/781 |
| 4,458,809 A | 7/1984 | White et al. | 198/790 |
| 4,473,148 A * | 9/1984 | Saur | 198/781.09 |
| 4,489,820 A | 12/1984 | Schneider | 198/448 |
| 4,502,593 A | 3/1985 | Van den Goor | 198/781 |
| 4,562,921 A | 1/1986 | Leemkuil et al. | 198/841 |
| 4,570,780 A | 2/1986 | Thwaites et al. | 198/781 |
| 4,640,409 A | 2/1987 | Holtman | 198/624 |
| 4,708,234 A | 11/1987 | Born et al. | 198/453 |
| 4,721,203 A | 1/1988 | Kimball et al. | 198/781 |
| 4,832,184 A | 5/1989 | Degood | 198/781 |
| 4,854,445 A | 8/1989 | Eaton et al. | 198/781 |
| 4,863,012 A | 9/1989 | Nord et al. | 198/781 |
| 4,889,224 A | 12/1989 | Denker | 198/382 |
| 4,919,256 A | 4/1990 | Gebhardt | 198/781 |
| 4,942,957 A | 7/1990 | Bonifer et al. | 198/781 |
| 5,082,109 A | 1/1992 | Blondeau | 198/781 |
| 5,101,958 A | 4/1992 | LeMay et al. | 198/436 |
| 5,147,023 A | 9/1992 | Meindl | 198/454 |
| 5,191,967 A | 3/1993 | Woltjer et al. | 198/781 |
| 5,240,101 A | 8/1993 | LeMay et al. | 198/443 |
| 5,244,081 A | 9/1993 | Kajii et al. | 198/790 |
| 5,311,979 A | 5/1994 | Risley et al. | 198/453 |
| 5,348,139 A | 9/1994 | Szarkowski et al. | 198/781 |
| 5,540,323 A | 7/1996 | Schiesser et al. | 198/781.06 |
| 5,575,220 A | 11/1996 | van Soest et al. | 105/163.1 |
| 5,582,287 A | 12/1996 | Heit et al. | 198/781.09 |
| 6,065,588 A | 5/2000 | Cotter et al. | 198/781.06 |

\* cited by examiner

CONTACT ASSEMBLY FOR ACCUMULATION CONVEYORS

CROSS REFERENCE TO RELATED APPLICATION

This is a continuation-in-part application of co-pending U.S. patent application Ser. No. 09/207,712, filed Dec. 9, 1998, and now abandoned, the entire disclosure of which is hereby incorporated herein by reference.

BACKGROUND OF THE INVENTION

The invention relates generally to accumulation conveyors and, more particularly, to pneumatically actuated accumulation conveyors.

Accumulation conveyors normally include conveying rollers that support product being conveyed and when rotated, transport the same in a particular direction. Positioned below the conveying rollers is an endless drive member, such as a composite belt, a padded chain, a linked belt, and the like, which is driven by a drive motor. The accumulation conveyor system is normally divided into a plurality of zones. Each zone of the conveyor is equipped with a product sensor for detecting the presence or absence of product at a particular position along the conveyor. Each of these sensors is operationally connected to a contact assembly positioned below the top run of the endless drive member. Each contact assembly includes a pneumatically, mechanically or electrically driven vertically reciprocal contact member which may be operated individually or be operationally interconnected with contact assemblies positioned in other zones of the conveyor.

In accordance with a particular control scheme dictating the selective movement of product along the conveyor, one or more of the contact assemblies are actuated to move the contact member into frictional contact with the endless drive member. When a particular contact member is in such frictional engagement with the endless drive member, the conveying rollers adjacent the control assembly are engaged by the top surface of the top run of the endless drive member and begin to rotate. This rotation in turn results in the transportation of product supported by the selected conveying rollers.

When it is desired to accumulate product within a particular zone of the conveyor the contact assembly within that zone vertically retracts, and hence moves out of driving engagement with the endless drive member. This in turn results in the disengagement of the top surface of the endless drive member from contact with the conveying rollers and thus, such conveying rollers cease rotation.

The endless drive member of the accumulation conveyor has a tendency to become misaligned with the contact assembly. Over the length of the conveyor, this misalignment may become pronounced and may cause the endless drive member to deviate from one or more contact members. This misalignment may be encountered whether using generally flat drive belts or V-shaped belts, i.e., belts having a protrusion formed on the lower surface. This deviation may even result in contact between the endless drive member and a side support rail, causing damage to both the endless drive member and the conveyor, as well as the inefficient conveyance of product.

Therefore, there exists a need for a contact assembly for an accumulation conveyor which overcomes the difficulties of the prior art while being exceptionally functional and economical to manufacture.

SUMMARY OF THE INVENTION

The invention is useful with an accumulation conveyor having an endless drive member, a plurality of conveying rollers and a plurality of contact assemblies configured to selectively reciprocally move into engagement with the endless drive member to move the endless drive member into engagement with the conveying rollers. According to an aspect of the invention, the contact assembly includes at least a portion configured to move in the plane of the endless drive member when in engagement with the endless drive member to thereby align the contact assembly and the endless drive member. Providing a contact assembly, a portion of which moves in the plane of the endless drive member, maintains the alignment between the contact assembly and the endless drive member, assuring that the endless drive member remains centered upon the contact assembly, and hence, maximizes efficient operation.

According to another aspect of the invention, an accumulation conveyor includes an endless drive member that is juxtaposed with a plurality of conveying rollers and travels in a particular plane. At least one sensor senses that the endless drive member is misaligned. At least one contact assembly is operably interconnected with the sensor and is selectively movable to bring the endless drive member into alignment with the associated contact assembly. The contact assembly includes a portion that is movable in the plane of the endless drive member. In this manner, the at least one contact assembly is configured to realign the endless drive member in response to the sensor sensing that the endless drive member is misaligned. The employment of a sensor operably connected to a contact assembly capable of realigning the endless drive member provides a reliable, effective control system for maintaining the alignment of the endless drive member.

According to yet another aspect of the invention, an accumulation conveyor includes a support member formed with at least one generally vertical guide member extending therefrom and carrying a force producing device. A contact member is supported by the support member and is moved into engagement with the endless drive member upon actuation of the force producing device. Engagement between the contact member and the endless drive member pivots the contact member about the at least one guide member to align the contact member with the endless drive member. This pivotal compliance maintains alignment between the contact member and the endless drive member, and hence prevents the endless drive member from moving off the contact member and potentially causing damage to the conveyor.

According to still yet another aspect of the invention, a contact assembly for an accumulation conveyor includes a support member, a force producing device carried by the support member, and a wheel assembly positioned between the force producing device and the conveying rollers. The wheel assembly includes at least one upstream roller and at least one downstream roller. Contact between the wheel assembly and the endless drive member pivots the wheel assembly about a substantially vertical axis between the upstream and downstream roller and closer to the upstream roller to thereby maintain alignment between the wheel assembly and the endless drive member.

According to still yet another aspect of the invention, an accumulation conveyor includes a force producing device carried by a support member, and a wheel assembly positioned between the force producing device and the support member. The wheel assembly is rotatably positioned on the at least one guide member and rotates about a generally vertical axis. The wheel assembly includes a first pair of contact rollers and a second pair of contact rollers. The first pair of contact rollers are positioned first in the direction of travel of the endless drive member, and are positioned a distance apart, whereby the distance is slightly larger than the width of the protrusion formed in the endless drive member. Contact between an inner surface of a contact roller of the first pair of contact rollers and the protrusion of the endless drive member pivots the platform to thereby maintain alignment between the platform and the endless drive member. Providing a pair of contact rollers attached to a pivoting platform, which are spaced so that engagement between the protrusion and the contact rollers pivots the platform to maintain alignment provides an effective and reliable structure for maintaining alignment between the platform and the endless drive member.

These and other objects, advantages, purposes, and features of the invention will become apparent upon review of the following specification in conjunction with the drawings.

DETAILED DESCRIPTION OF THE PREFERRED EMBODIMENTS

The present invention finds particular application as a contact assembly for use in conjunction with the conveyor set forth in the commonly assigned U.S. Pat. No. 5,540,323 issued to Schiesser et al. for a MODULAR PNEUMATIC ACCUMULATION CONVEYOR, and U.S. Pat. No. 6,065, 588, issued to Cotter et al. entitled CONTACT ASSEMBLY FOR ACCUMULATION CONVEYORS, the disclosures of which are hereby incorporated herein by reference.

Figure 1:
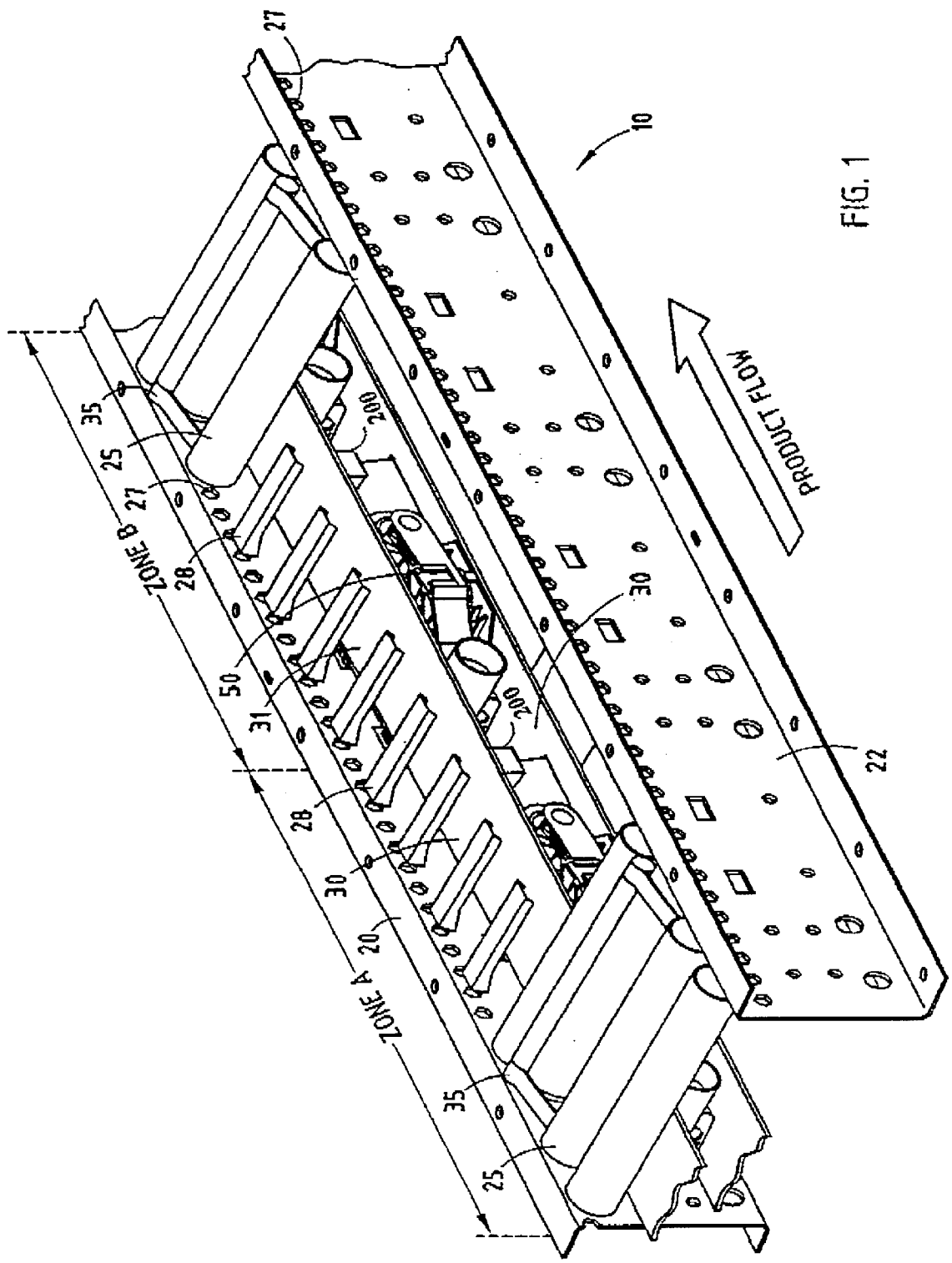
FIG. 1 is a perspective view of a segment of an accumulation conveyor according to the invention.
Figure 2:
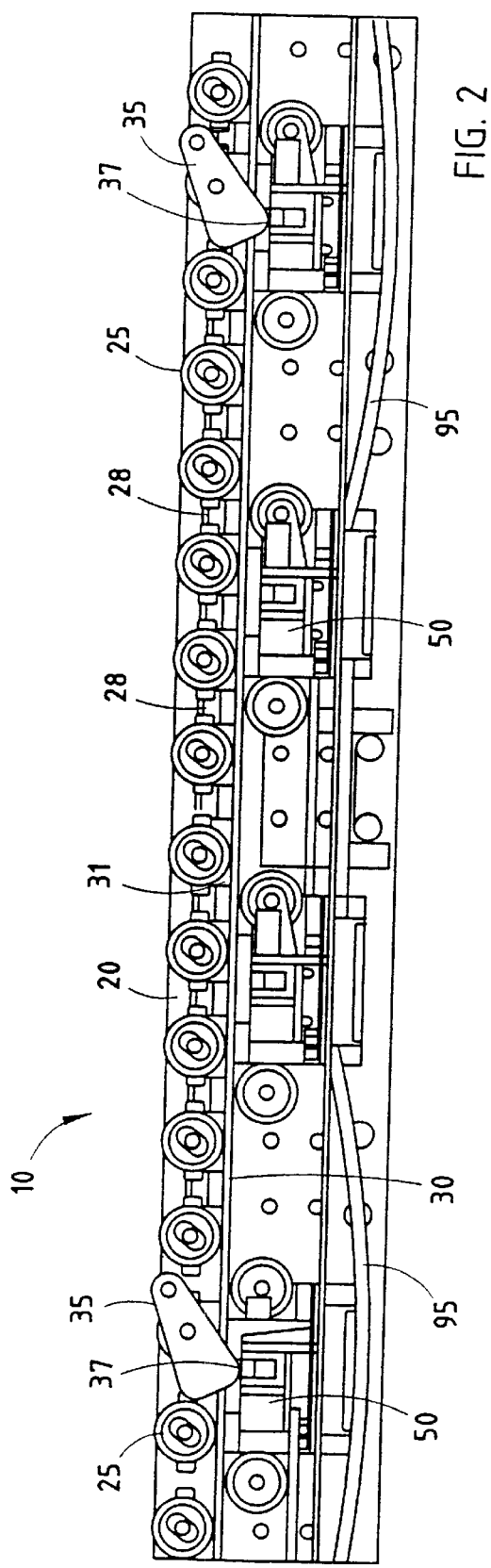
FIG. 2 is side elevation of the accumulation conveyor segment of FIG. 1.
Figure 3:
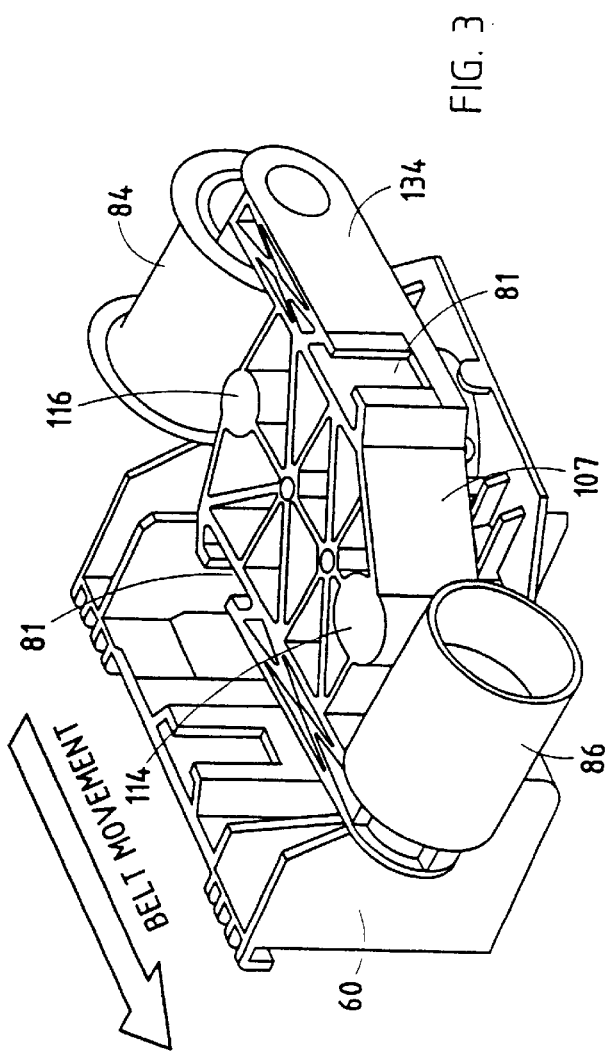
FIG. 3 is a perspective view of a contact assembly according to the invention.
Figure 4:
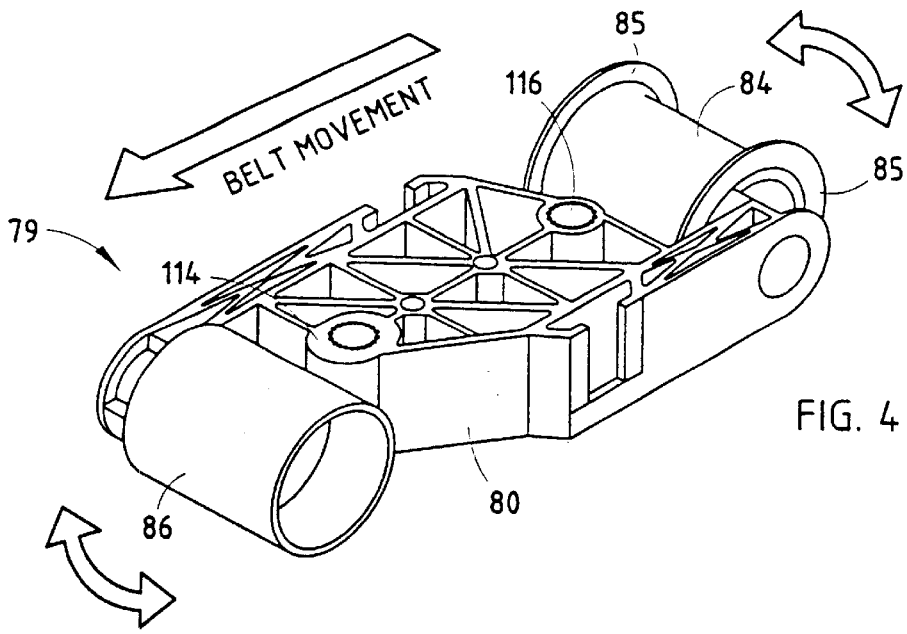
FIG. 4 is a perspective view of the contact member of FIG. 3.

Referring now specifically to FIG. 1 and 2, an accumulation conveyor 10 normally includes a pair of side support rails 20 and 22. Side rails 20 and 22 are joined by cross members (not shown) positioned at longitudinally spaced intervals. A plurality of rotatably mounted conveying rollers 25 extend between side rails 20 and 22 along the entire length of accumulation conveyor 10. Conveying rollers 25 define a conveying surface upon which product is transported. Conveying rollers 25 are captured within hexagonal holes 27 formed in side rails 20 and 22. Conveying rollers 25 are placed a preselected distance apart, preferably on three inch centers. When so positioned, finger guards 28 may be provided between adjacent conveying rollers 25 in order to provide protection against a user engaging the moving components of accumulation conveyor 10. Finger guards 28 are captured within hexagonal holes 27 formed in side rails 20 and 22.

Accumulation conveyor 10 is divided into a plurality of zones. In FIG. 1, only zone A and zone B are illustrated, however it will be appreciated by those with ordinary skill in the art that accumulation conveyor 10 may have any number of zones. An endless drive member 30, such as drive belt, provides the mechanical force for driving conveying rollers 25. Endless drive member 30 is driven by a drive assembly (not shown) which imparts motion upon endless drive member 30 in a preselected direction and moves endless drive member 30 in a particular plane. As shown, endless drive member 30 is positioned in proximity to side support rail 20. However, it will be recognized that endless drive member 30 may also be positioned in proximity to side support rail 22 or any position between the rails. Each zone of accumulation conveyor 10 includes at least one contact assembly 50 juxtaposed with the upper portion 31 of endless drive member 30 beneath conveying rollers 25. Each contact assembly 50 is adapted to bring upper portion 31 of endless drive member 30 into driving engagement with conveying rollers 25 located immediately above the particular contact assembly 50. A product sensor 35 is provided for each zone of accumulation conveyor 10 in order to operatively control the contact assembly or assemblies 50 for that zone, in accordance with a preselected control scheme. Each product sensor 35 operatively engages an actuator 37, normally a pneumatic valve, which controls the vertically reciprocative movement of the contact assembly 50. The details of product sensor 35, actuator valve 37, and the control scheme by which they are operated is set forth in detail in U.S. Pat. No. 5,540,323, which has hereinabove been incorporated by reference. It will be recognized by those with ordinary skill in the art that there exists a variety of product sensors and actuators, any of which may be substituted for a product sensor 35 and actuator valve 37 without departing from the spirit and scope of the preset invention. An example of an alternative product sensor includes photodetectors.

Details of contact assembly 50 are disclosed in commonly assigned U.S. Pat. No. 6,065,588, and will not be repeated herein. In an embodiment, as shown in FIGS. 3 through 9, a wheel assembly or contact member 79 is formed with a first or rear contact roller 84 and lead or second contact roller 86. Each contact roller 84, 86 defines a drive member engagement section. First contact roller 84 is positioned upstream in the direction of endless drive member 30. The direction of travel of endless drive member 30 is represented by the directional arrow in FIGS. 3 and 4. Platform 80 is formed with a pair of posts 114 and 116. Posts 114 and 116 are formed with a channel 118 and 118', respectively, each of which is dimensioned to receive a respective guide member 75, 75' formed in support member 60. Post 116 is positioned in proximity to first contact roller 84, while post 114 is positioned in proximity to second contact roller 86. Channel 118 is formed having a sufficiently wider diameter than its respective post 75 to allow lateral movement of contact member 79 with respect to movement of endless drive member 30.

Preferably, channel 118' has a diameter only slightly larger than its respective post 75' thereby providing a pivot to allow contact member 79 to pivot about a vertical pivot as it moves laterally in the plane of travel of endless drive member 30. Contact rollers 84 and 86 are preferably crowned with their diameters greater in their center and gradually tapering outwardly. As a result, when endless drive member 30 becomes misaligned with first contact roller 84, the crowned surface of first contact roller 84 will attempt to bring endless drive member 30 into alignment with the contact roller. Because contact member 79 is capable of pivoting about post 75', the force created between endless drive member 30 and the contact roller will tend to laterally move contact member 79. If endless drive member 30 becomes more extensively misaligned along contact rollers 84 and 86, endless drive member 30 will contact one of the pair of out-turned flanges 85 located at opposing ends of first contact roller 84. Contact between endless drive member 30 and a flange 85 will exert a rotational force upon contact member 79, rotating contact member 79 about guide member 75' positioned within channel 118'. As contact member 79 rotates about guide member 75', the widened diameter of channel 118 enables contact member 79 to shift position to compensate for the misalignment of endless drive member 30. This is accomplished by contact roller 84 moving toward alignment with endless drive member 30 as seen by the arrows at the right side of FIG. 4. It is also believed that the opposite direction offset of second contact roller 86 also assists in causing endless drive member 30 to move into alignment with contact member 79. As illustrated by the arrows at the left side of FIG. 4, pivoting of contact member 79 about post 75' will cause a lateral movement of second contact roller 86 that is opposite from the lateral movement of first contact roller 84. The crowned surface of second contact roller 86 will cause a force tending to bring endless drive member 30 into alignment with contact member 79. In this manner, contact member 79 moves into alignment with endless drive member 30 and endless drive member 30 is moved into alignment with contact member 79. Preferably, the distance between first contact roller 84 and post 75' is less than the distance between second contact roller 86 and post 75'. This provides a multiplier effect whereby a small lateral deflection of first contact roller 84 caused by misalignment of endless drive member 30, results in a larger movement of second contact roller 86 to further assist in pulling endless drive member 30 into alignment with contact member 79.

It can be seen that flanges 85 and the crowned configuration of contact rollers 84 and/or 86 assist in bringing contact member 79 into alignment with endless drive member 30. However, either of these could be used alone. Other alternatives are possible. For example, a vertical surface such as a wheel rotated on a vertical axis may be provided on platform 80 to contact an edge of endless drive member 30, and rotate contact member 79 about post 75'. This shift in position due to the rotation of contact member 79 maintains the alignment between contact rollers 84 and 86 and endless drive member 30.

Figure 6:
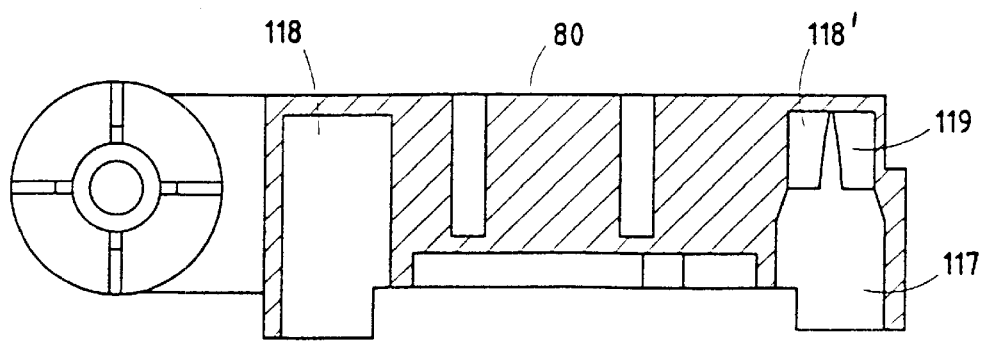
FIG. 6 is a cross sectional view of the contact member depicted in FIG. 5, taken along line VI—VI of FIG. 5.
Figure 7:
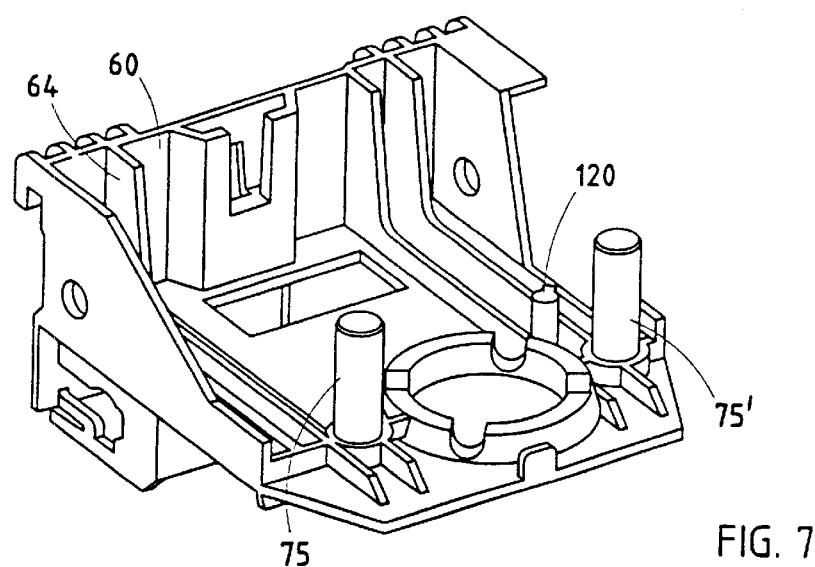
FIG. 7 is a perspective view of a support member of FIG. 3.

In the most preferred embodiment guide members 75, 75' have an outer diameter of approximately 0.496 inches. Also, in the most preferred embodiment, the diameter of channel 118 is approximately 0.605 inches. Moreover, as illustrated in FIG. 6, channel 118' is preferably formed with a widened lower region 117 which is narrowed in an upper region 119. The presence of a wider lower region 117 enables guide member 75 to be centered within channel 118' during assembly, while the narrower upper region 119 holds guide member 75 securely in place. In the most preferred embodiment, upper region 119 of channel 118' has a diameter of approximately 0.505 inches.

In the most preferred embodiment, the distance between the center lines of shafts 128, 138 is approximately 6.00 inches with each contact roller 84, 86 having an approximate outer diameter of 1.75 inches. When so dimensioned, an accumulation conveyor 10 having conveying rollers 25 spaced on 3.00 inch centers permits contact assemblies 50 to be positioned such that each conveying roller 25 is driven by a particular contact roller 84, 86 of a particular contact assembly 50 as shown in FIG. 2.

Figure 5:
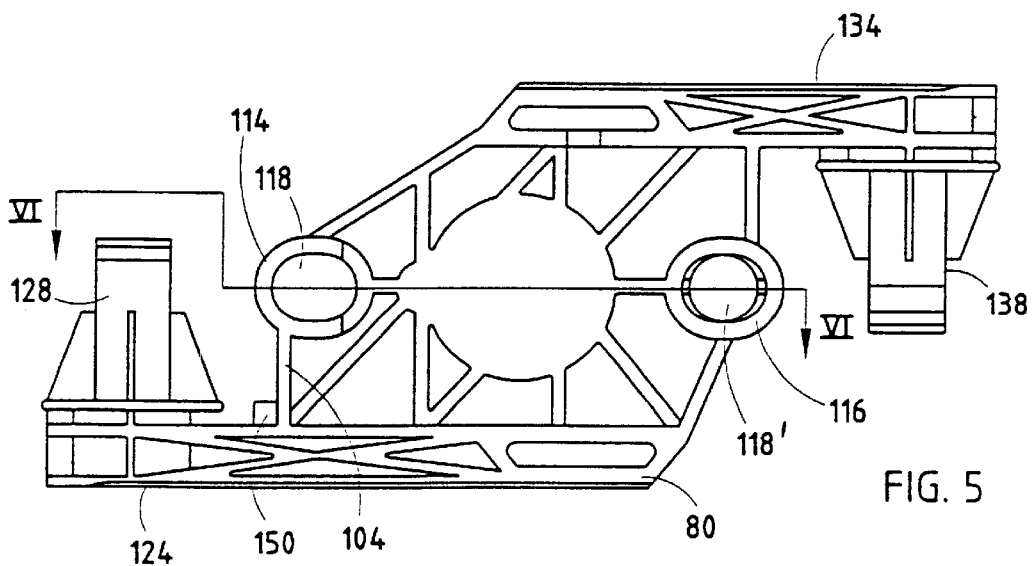
FIG. 5 is a bottom view of the contact member depicted in FIG. 4, shown without the contact rollers attached thereto.
Figure 8:
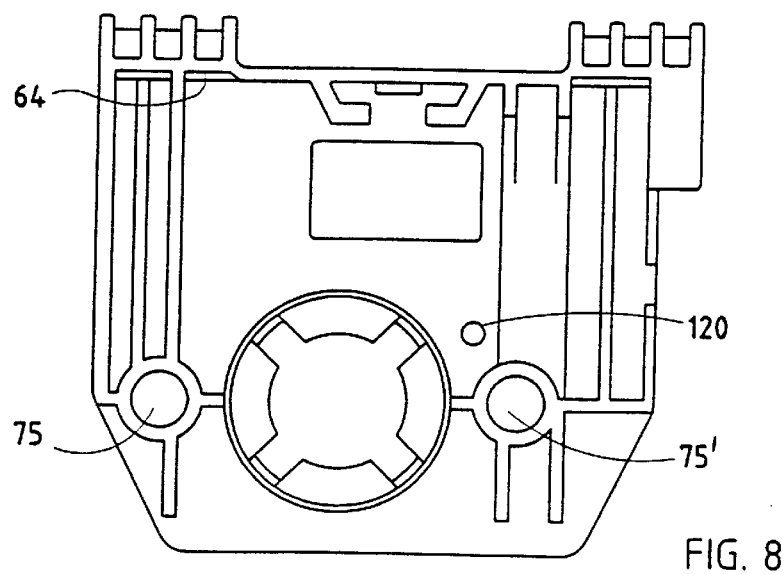
FIG. 8 is a top plan view of the support member illustrated in FIG. 7.

Preferably, support member 60 is formed with an orientation member such as a rib 120. The presence of rib 120 prevents the improper placement of contact member 79 on support member 60. As shown in FIG. 8 when the accumulation conveyor has a drive belt positioned in proximity to side support rail 20 with the flow of product going in the direction indicated by the directional arrow, rib 120 is positioned in proximity to guide member 75''. Consequently, when platform 80 is properly positioned on support member 60 such that arm 124 is positioned proximate to back 64 of support member 60, rib 120 will be positioned in a cavity defined by webbing 111. An improper attempt to place platform 80 upon support member 60 such that arm 134 is proximate to back 64 of support member 60 will result in rib 120 contacting a stop member 150 positioned mid-height between end 104 and arm 124 (FIG. 5).

Figure 9:
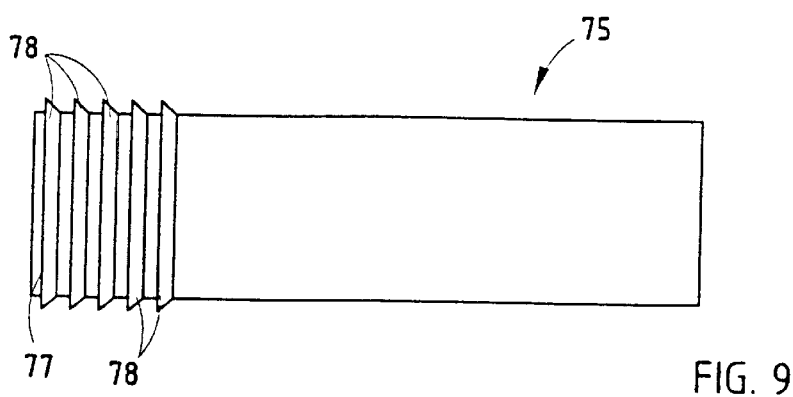
FIG. 9 is a detailed view of a guide member according to the invention.

In a preferred embodiment, as shown in FIG. 9, each guide member 75, 75' is formed having a lower region 77. A series of circumferentially positioned barbs 78 extend from lower region 77. During assembly, when lower region 77 of guide member 75, 75' is positioned within a mating aperture (not shown) formed in support member 60, barbs 78 maintain securement of guide member 75, 75' within the aperture, and thus prevent guide member 75, 75' from becoming loose due to the repetitive vertical forces imparted by vertically reciprocating contact member 79.

Preferably, support member 60, contact member 79 and contact rollers 84, 86 are each manufactured of a polymeric material. Also, it is preferred that support member 60, contact member 79 and contact rollers 84, 86 are manufactured by a single forming process. In the most preferred embodiment, support member 60 and contact member 79 are formed of a glass filled polypropylene. Most preferably, the glass fibers are present in an amount of approximately 30% by weight. Also, in the most preferred embodiment, conveying rollers 84, 86 are formed of an acetal resin.

Turning now to FIGS. 10 through 14, in another preferred alternative embodiment. accumulation conveyor 10 includes an endless drive member 160, which provides the mechanical force for driving the conveying rollers. Endless drive member 160 is formed having a protrusion 162 projecting from lower, or inner surface 164. Projection 162 is continuous. and is generally parallel to edges 161 of drive belt 160. Top run 163 of endless drive member 160 travels in the direction indicated by the directional arrow of FIG. 10 with product flow in an opposite direction, as also indicated by a directional arrow. As shown most clearly in FIGS. 13 and 14, protrusion 162 has a generally tapered, pyramidal shape with a truncated end 166. However, it will be recognized by those with ordinary skill in the art that protrusion 162 may assume other shapes without deviating from the spirit and scope of this invention.

In this embodiment, a contact member 169 has a wheel assembly or platform 170 including a central section 172, a front section 174, and an arm 176 extending from rear surface 178. Opposing sides 180 and 182 each have an actuator valve receiving section 184. Arm 176, extending from rear surface 178, carries a first pair of contact rollers 186, while front section 174 of platform 170 carries a second pair of contact rollers 188. The top surface of each contact roller of first pair of contact rollers 186 and second pair of contact rollers 188 reside substantially in a single plane, above the plane defined by top surface 173 of platform 170. First pair of contact rollers 186 and second pair of contact rollers 188 each define a drive member engagement section. Each contact roller 186a, 186b of first pair of contact rollers 186 is journaled to a shaft 190 extending substantially orthogonally from arm 176. Each contact roller 188a, 188b of second pair of contact rollers 188 is journaled to a shaft 198 extending substantially orthogonally from front section 174 of platform 170. First pair of contact rollers 186 and second pair of contact rollers 188 are each generally axially aligned. Each contact roller 186a, 186b of first pair of contact rollers 186 has an inner surface 187, defining a distance 194 therebetween. Additionally, each contact roller 188a, 188b of second pair of contact rollers 188 has an inner surface 189, defining s a space 196 therebetween.

Platform 170 is formed with a pair of posts 202 and 204. Each post 202, 204 is formed with a channel dimensioned to receive a guide member 206, 206' formed in support member 205. Post 202 is positioned in proximity to first pair of contact rollers 186, while post 204 is positioned in proximity to second pair of contact rollers 188. The channel formed within post 204 has a wider diameter than the channel formed in post 202.

Figure 10:
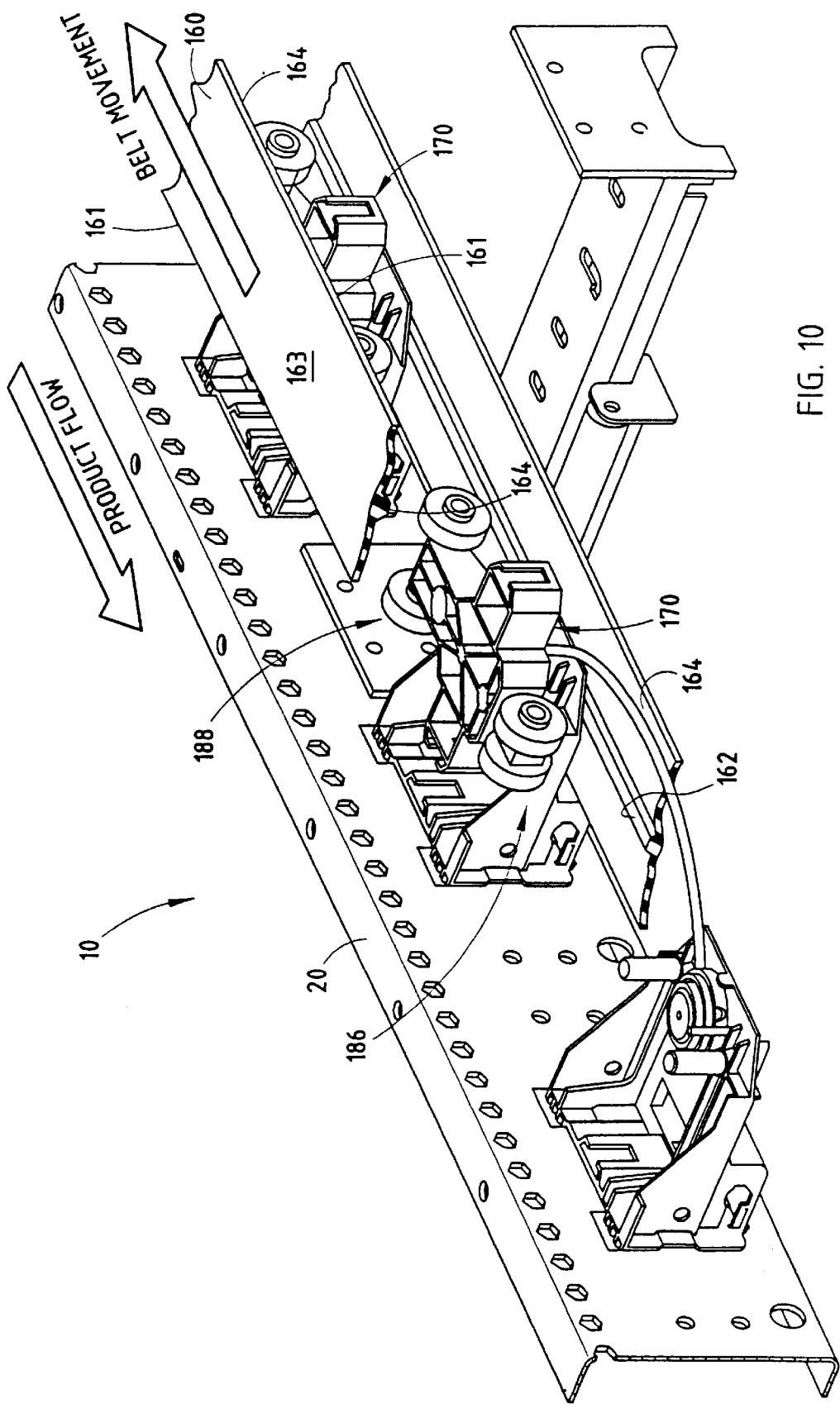
FIG. 10 is a perspective view of a segment of an accumulation conveyor according to an alternative preferred embodiment of the invention, with a portion of the endless drive member cut away.
Figure 11:
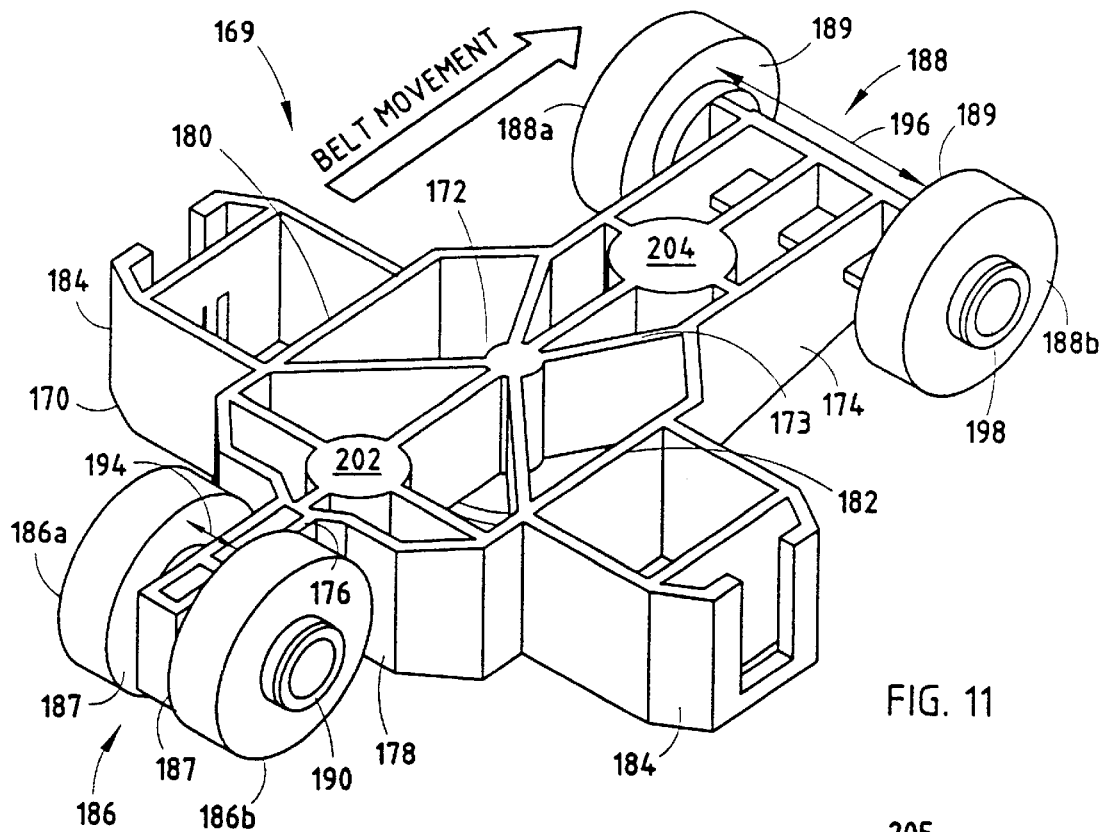
FIG. 11 is a perspective view of a contact member depicted in FIG. 10.
Figure 12:
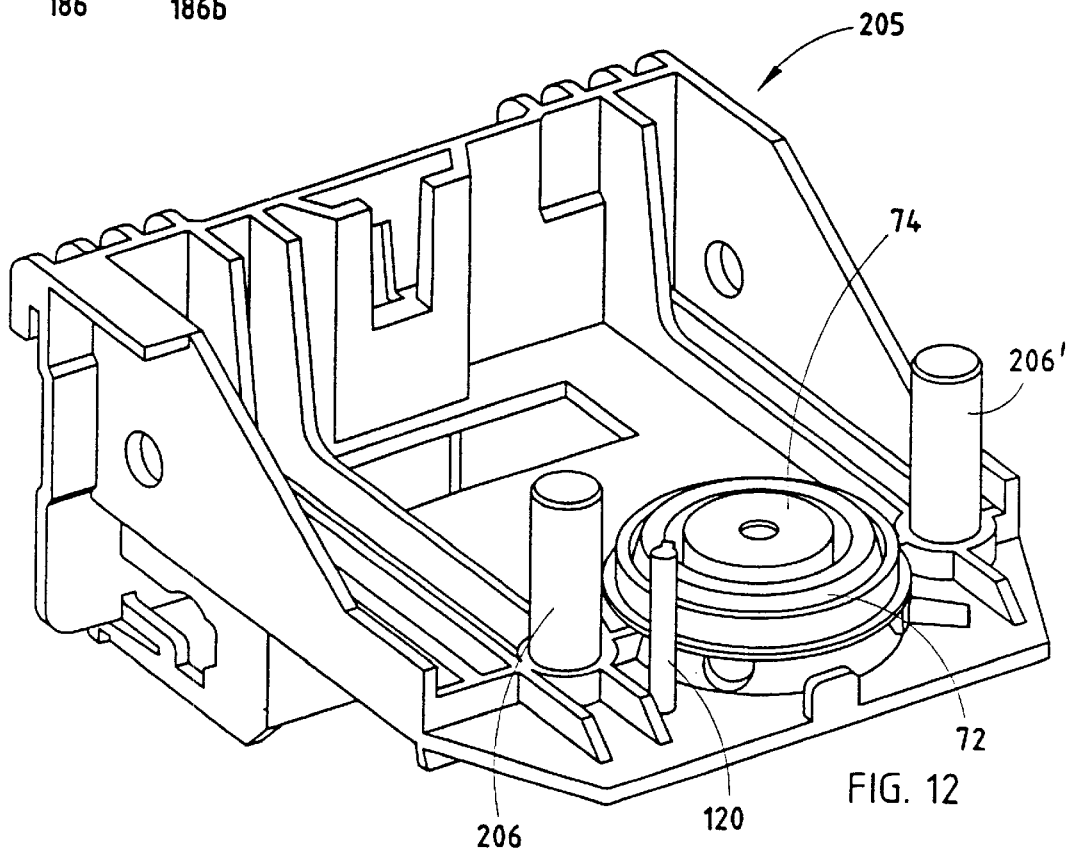
FIG. 12 is a perspective view of a support member depicted in FIG. 10.
Figure 13:
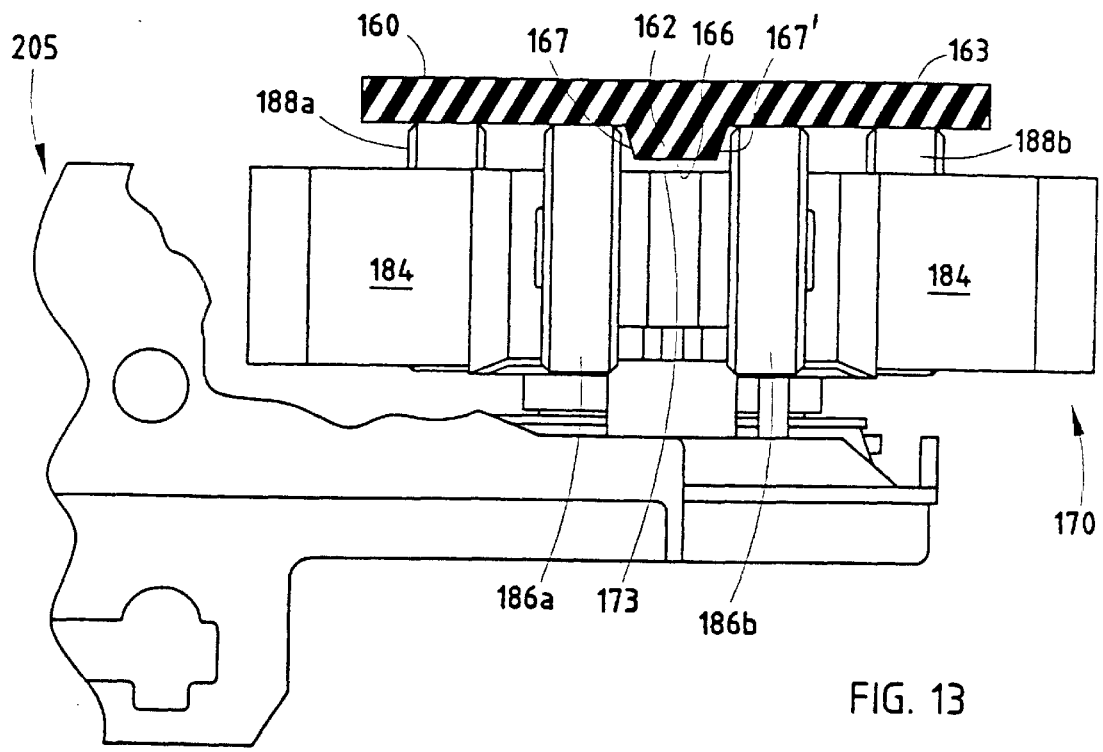
FIG. 13 is a partially fragmented, rear view of the contact assembly depicted in FIG. 10, with the endless drive member show n in cross section.
Figure 14:
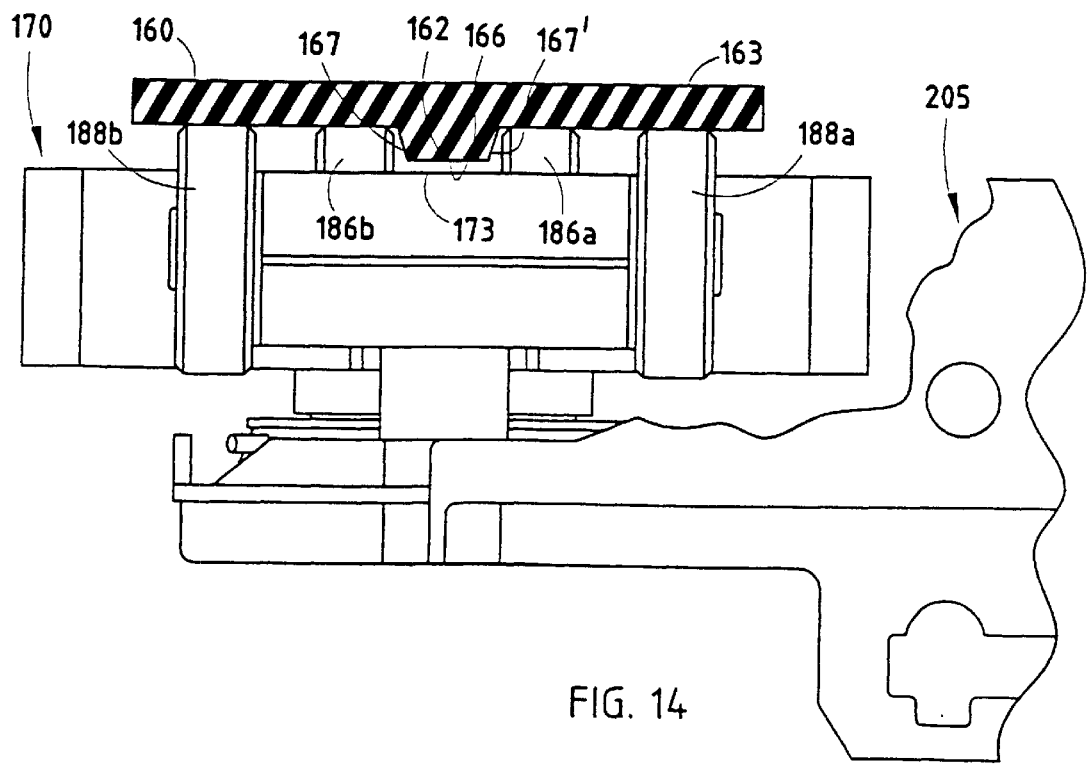
FIG. 14 is a partially fragmented, front view of the contact assembly depicted in FIG. 13, with the endless drive member shown in cross section.

In operation, platform 170 is placed upon support member 205 with post 202 being received by guide member 206, and post 204 being received by guide member 206'. Thus, as shown in FIG. 10, first pair of contact rollers 186 are positioned first in the direction of travel of endless drive member 160. When platform 170 is vertically reciprocated by diaphragm 74, first pair of contact rollers 186 and second pair of contact rollers 188 engage inner surface 164 of top run 163 endless drive member 160 and thus urge endless drive member 160 into engagement with conveying rollers 25. Protrusion 162 of endless drive member 160 is positioned in the space 194 defined between first pair of contact rollers 186 and the space 196 defined between second pair of contact rollers 188, with truncated end 166 of protrusion 162 residing a preselected distance above top surface 173 of platform 170. The distance between contact rollers 186a, 186b of first pair of contact rollers 186 is slightly larger than the width of protrusion 162 and less than the distance between contact rollers 188a, 188b of second pair of contact rollers 188.

During operation, if endless drive member 160 becomes misaligned, surface 167 or 167' of protrusion 162 will contact an inner surface 187 of a contact roller 186a or 186b of first pair of contact rollers 186. Contact between protrusion 162 and contact rollers 186a, 186b effects the lateral movement of platform 170 with respect to the plane of travel of endless drive member 160. Specifically, contact between protrusion 162 and contact rollers 186a, 186b pivots or rotates platform 170 about the vertical axis of guide member 206. The widened diameter of the channel of post 204 enables platform 200 to move in a lateral direction to the direction of endless drive member 160, and thereby maintain the alignment between first pair of contact rollers 186, second pair of contact rollers 188, and endless drive member 160. Specifically, contact between protrusion 162 and first pair of contact rollers 186 pivots or rotates the position of platform 170 so that first pair of contact rollers 186 and second pair of contact rollers 188 remain centered on top run 163 of endless drive member 160. This pivotal movement of contact member 169 causes contact rollers 188a and 188b to become laterally offset with respect to endless drive member 160. The lateral static friction between rollers 188a, 188b and endless drive member 160 tends to draw endless drive member 160 back into alignment with contact member 169. Diaphragm 74 does not pivot with platform 170, but remains in its vertical orientation and supported within cavity 72.

Support member 205 is structurally similar to support member 60 except for the position of rib 120. In support member 205, rib 120 is positioned proximate to guide member 206, so as to prevent the improper placement of platform 170 on support member 205. Also, posts 202, 204 have the same respective shapes as posts 75, 75' and sit within channels having the same respective shapes as channels 118 and 118'. Also, the relative spacing between contact rollers 186, 188 and posts 202, 204 are generally the same as the spacing between contact rollers 84, 86 and post 118, 118'.

In a preferred alternative embodiment, an endless drive member sensor 200 (FIG. 1) which senses the lateral position of endless drive member 30 is employed to monitor the position of endless drive member 30. Endless drive member sensor 200 is operably interconnected to one or more contact assemblies 50 by any means commonly utilized in the art. In the event endless drive member 30 becomes misaligned, a signal is sent from sensor 200 to contact assembly 50 resulting in the rotation or pivotal movement of contact member 79, 169 in order to maintain alignment between endless drive member 30 and contact member 79, 169. Endless drive member sensor 200 may be any sensor commonly employed in the art.

Figure 15:
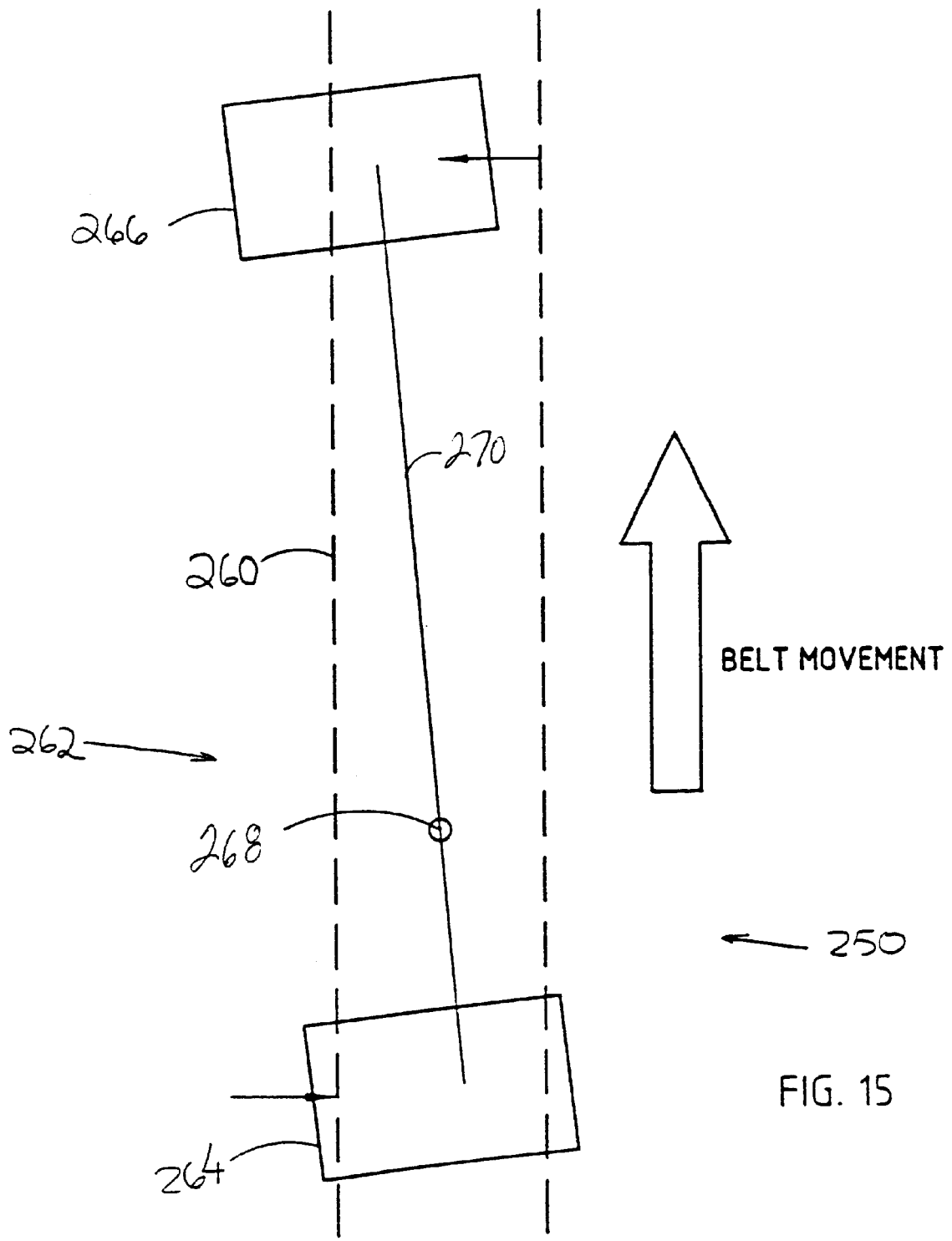
FIG. 15 is a plan view of an accumulation conveyor according to an alternative preferred embodiment.

With reference to FIG. 15, an accumulation conveyor 250 includes an endless drive member 260 traveling in a particular direction, indicated by the directional arrow, and within a plane. Accumulation conveyor 250 includes one or more contact assemblies 262 configured to selectively reciprocally engage endless drive member 160 perpendicular to the plane of FIG. 15. Contact assembly 262 includes a sensor 264 which senses the misalignment of endless drive member 260 within the plane of travel, and a coupling 270 which transfers misalignment sensed by sensor 264 to an aligning member 266 configured to reposition endless drive member 260 into alignment with contact assembly 262 when sensor 264 senses misalignment of endless drive member 260. In the illustrated embodiment, sensor 264 is a roller 84, 186 which senses misalignment of endless drive member 260 and repositions aligning member 266 by pivoting platform 170 about pivot 268. This laterally deflects and somewhat rotates aligning member 266 with respect to endless drive member 260. This motion of aligning member 266 causes endless drive member 260 to move left as viewed in FIG. 15. Aligning member 266 thus moves in the plane of endless drive member 260 to realign contact assembly 262 with endless drive member 260.

As discussed above, sensor 264 can be either first contact roller 84 or first pair of contact rollers 186, while aligning member 266 is either second contact roller 86 or second pair of contact rollers 188. In those embodiments, sensor 264 causes aligning member 266 to pivot or rotate about a pivot 268 to realign contact assembly 262 with endless drive member 260. However, sensor 264 may also be an electronic or mechanical sensor, such as for example, a photoeye, carried by, or in proximity to, contact assembly 262, and in operational connection therewith, which issues a signal to an electronic or mechanical actuator that is employed to move aligning member 266 and thus realign contact assembly 262 with endless drive member 260. Aligning member 266 may be moved in a purely rotational fashion to realign endless drive member 260 rather than the illustrated combination of rotation and lateral deflection.

Changes and modifications in the specifically described embodiments can be carried out without departing from the principles of the invention. For example, although the drive member engagement section has been described as either contact rollers or pairs of contact rollers, it will be understood by those with ordinary skill in the art that drive member engagement section may, for example, take the form of a flat surface such as that disclosed in U.S. Pat. No. 5,540,323, the disclosure of which has been incorporated herein by reference. Also, endless drive member 30 may be a padded chain, a linked belt, or continuous belt of any cross sectional configuration. Therefore, the present invention is intended to be limited only by the scope of the appended claims, as interpreted according to the principles of patent law including the doctrine of equivalents.

The embodiments of the present invention in which an exclusive property or privilege is claimed are defined as follows:

1. A contact assembly for an accumulation conveyor having a plurality of conveying rollers and an endless drive member having an upper portion traveling in a plane, said contact assembly selectively reciprocally movable into engagement with the endless drive member to bring the upper portion of the endless drive member into selective engagement with the conveying rollers, at least a portion of said contact assembly configured to move in said plane to align said contact assembly with said endless drive member.

2. The contact assembly of claim 1, wherein movement of said portion of said contact assembly into alignment with the endless drive member displaces another portion of said contact assembly in a manner which moves the endless drive member into alignment with said contact assembly.

3. The contact assembly of claim 2, wherein said portion is upstream of said another portion with respect to movement of the endless drive member.

4. The contact assembly of claim 3, wherein said contact assembly pivots about an axis that is closer to said portion than to said another portion.

5. The contact assembly of claim 1, wherein a surface of the endless drive member having a substantially vertical component engages a surface of said contact assembly to move said contact assembly in said plane.

6. The contact assembly of claim 5, wherein said surface of said contact assembly is at an upstream portion with respect to the movement of the endless drive member.

7. The contact assembly of claim 5, wherein said contact assembly pivots about a substantially vertical axis.

8. The contact assembly of claim 7, wherein said substantially vertical axis is closer to said upstream portion than to a downstream portion of said contact assembly.

9. The contact assembly of claim 1, wherein said contact assembly includes at least one contact roller having a crowned surface, wherein engagement between the endless drive member and said crowned surface moves said contact assembly in said plane.

10. The contact assembly of claim 9, wherein said at least one contact roller has at least one end formed with a flange, wherein engagement between the endless drive member and said flange moves said contact assembly in said plane.

11. The contact assembly of claim 1, wherein said contact assembly includes at least one contact roller having at least one end formed with a flange, wherein engagement between the endless drive member and said flange moves said contact assembly in said plane.

12. The contact assembly of claim 11, wherein said at least one contact roller is a first contact roller and a second contact roller, wherein said first contact roller has at least one end formed with a flange and is positioned upstream of said second contact roller with respect to the movement of the endless drive member.

13. The contact assembly of claim 5, wherein the endless drive member has an inner surface formed with a protrusion, and wherein said contact assembly includes at least one pair of spaced apart contact rollers defining a space therebetween, wherein the protrusion is positioned within said space, and wherein said surface of said contact assembly is an inner surface of a contact roller of said at least one pair of contact rollers.

14. The contact assembly of claim 13, wherein said at least one pair of contact rollers is a first pair of contact rollers and a second pair of contact rollers, wherein said first pair of contact rollers is positioned upstream of said second pair of contact rollers with respect to the movement of the endless drive member.

15. The contact assembly of claim 1, further comprising a platform having at least one drive member engagement section, said at least one drive member engagement section reciprocally engaging the endless drive member.

16. The contact assembly of claim 15, further comprising a support member, said support member supporting said platform, said support member formed with an orientation member.

17. The contact assembly of claim 15, wherein said at least one drive member engagement section is configured to move said platform in said plane when said at least one drive member engagement section engages the endless drive member.

18. The contact assembly of claim 15, wherein said at least one drive member engagement section is a first drive member engagement section and a second drive member engagement section.

19. The contact assembly of claim 18, wherein said first drive member engagement section is a first contact roller and said second drive member engagement section is a second contact roller, said first contact roller positioned first in the direction of travel of the endless drive member, one of said contact rollers having a pair of ends, at least one end of said pair of ends formed with an out-turned flange, wherein contact between the endless drive member and said out-turned flange moves said platform in said plane.

20. The contact assembly of claim 19, wherein said out-turned flange is formed on an end of said first contact roller.

21. The contact assembly of claim 19, wherein said out-turned flange is formed on each end of said first contact roller.

22. The contact assembly of claim 18, wherein said first drive member engagement section is a first pair of contact rollers and said second drive member engagement section is a second pair of contact rollers.

23. The contact assembly of claim 22, wherein the endless drive member has an undersurface formed with a protrusion projecting therefrom and is positioned between said first pair of contact rollers and said second pair of contact rollers when said first pair and said second pair of contact rollers engage the endless drive member.

24. The contact assembly of claim 23, wherein the protrusion of the endless drive member has a width and each contact roller of said first pair of contact rollers and said second pair of contact rollers has an inner surface, at least one pair of said first pair of contact rollers and said second pair of contact rollers being spaced a preselected distance apart, wherein said preselected distance is slightly greater than the width of the protrusion so that contact between said inner surface of a contact roller and the protrusion moves said platform in said plane.

25. The contact assembly of claim 24, wherein said first pair of contact rollers are spaced said preselected distance apart and positioned first in the direction of movement of the endless drive member.

26. The contact assembly of claim 25, wherein said first pair of contact rollers are spaced a first distance apart and said second pair of contact rollers are spaced a second distance apart, wherein said second distance is greater than said first distance.

27. An accumulation conveyor comprising:
a plurality of conveying rollers, and an endless drive member juxtaposed with said conveying rollers, said endless drive member having an upper portion traveling in a plane;
a support member having at least one generally vertical guide member;
a force-producing device carried by said support member; and
a contact member supported by said support member, wherein actuation of said force-producing device moves said contact member into engagement with said endless drive member and said endless drive member into engagement with said conveying rollers, wherein engagement between said contact member and said endless drive member pivotally moves said contact member about said at least one guide member in said plane to align said contact member with said endless drive member.

28. The accumulation conveyor of claim 27, wherein said at least one generally vertical guide member is a first generally vertical guide member and a second generally vertical guide member, wherein said contact member pivotally moves about said first generally vertical guide member and said second generally vertical guide member limits movement of said contact member.

29. The accumulation conveyor of claim 27, wherein said contact member has at least one drive member engagement section, wherein actuation of said force-producing device moves said at least one drive member engagement section into engagement with said endless drive member and said endless drive member into engagement with said conveying rollers, wherein engagement between said at least one drive member engagement section and said endless drive member pivotally moves said contact member about said at least one guide member to align said contact member with said endless drive member.

30. The accumulation conveyor of claim 29, wherein said at least one drive member engagement section is a first drive member engagement section and a second drive member engagement section.

31. The accumulation conveyor of claim 30, wherein said first drive member engagement section is at least a first contact roller and said second drive member engagement section is at least a second contact roller.

32. The accumulation conveyor of claim 31, wherein said first contact roller has a pair of ends, at least one end of said pair of ends formed with an out-turned flange, wherein contact between said out-turned flange and said endless drive member pivots said contact member about said at least one guide member to thereby align said contact member with said endless drive member.

33. The accumulation conveyor of claim 32, wherein at least one of said first contact roller and said second contact roller is a crowned contact roller.

34. The accumulation conveyor of claim 32, wherein each end of said first contact roller is formed with an out-turned flange.

35. The accumulation conveyor of claim 31, wherein said first contact roller is positioned first in the direction of travel of said endless drive member.

36. The accumulation conveyor of claim 30, wherein said contact member is formed with at least one post having a channel dimensioned to receive said at least one generally vertical guide member.

37. The accumulation conveyor of claim 36, wherein said generally vertical guide member is a first guide member and a second guide member, said contact assembly pivotally moving about said first guide member, wherein said first guide member is positioned closer to said first drive member engagement section than to said second drive member engagement section.

38. The accumulation conveyor of claim 37, wherein said at least one post is a first post and a second post, said first post having a first channel dimensioned to receive said first guide member, said second post having a second channel dimensioned to receive said second guide member.

39. The accumulation conveyor of claim 38, wherein said first channel has a first diameter, wherein said second channel has a second diameter, said second diameter being greater than said first diameter.

40. The accumulation conveyor of claim 27, wherein said support member is formed with a rib extending therefrom in a substantially vertical direction.

41. The accumulation conveyor of claim 31, wherein said endless drive member has a substantially flat cross section.

42. The accumulation conveyor of claim 30, wherein said first drive member engagement section is a first pair of contact rollers and said second drive member engagement section is a second pair of contact rollers.

43. The accumulation conveyor of claim 42, wherein said endless drive member has an undersurface formed with a protrusion projecting therefrom, said protrusion positioned between said first pair of contact rollers and said second pair of contact rollers when said first pair of contact rollers and said second pair of contact rollers engage said endless drive member.

44. The accumulation conveyor of claim 43, wherein said protrusion has a width and each contact roller of said first pair of contact rollers and said second pair of contact rollers has an inner surface, at least one pair of said first pair of contact rollers and said second pair of contact rollers being spaced a preselected distance apart, wherein said preselected distance is slightly greater than said width of said protrusion so that contact between said inner surface of a contact roller and said protrusion pivots said contact member.

45. The accumulation conveyor of claim 44, wherein said first pair of contact rollers are spaced said preselected distance apart and positioned first in the direction of travel of said endless drive member.

46. The accumulation conveyor of claim 45, wherein said first pair of contact rollers are spaced a first distance apart and said second pair of contact rollers are spaced a second distance apart, wherein said second distance is greater than said first distance.

47. The accumulation conveyor of claim 44, wherein said at least one generally vertical guide member is a first guide member and a second guide member, and said contact member includes a first post and a second post, said first post having a first channel dimensioned to receive said first guide member, said first post positioned proximate to said first pair of contact rollers, said second post having a second channel dimensioned to receive said second guide member, said second post positioned proximate to said second pair of contact rollers.

48. The accumulation conveyor of claim 47, wherein said first channel has a first diameter, wherein said second channel has a second diameter, said second diameter being greater than said first diameter.

49. A contact assembly for an accumulation conveyor having a plurality of conveying rollers, and an endless drive member having an upper portion juxtaposed with the conveying rollers, wherein the upper portion of the endless drive member travels in a plane, said contact assembly comprising:
a support member;
a force-producing device carried by said support member; and
a wheel assembly positioned between said force-producing device and the conveying rollers, wherein actuation of said force-producing device moves said wheel assembly into engagement with the upper portion of the endless drive member and the upper portion of the endless drive member into engagement with the conveying rollers, said wheel assembly including at least one upstream roller and at least one downstream roller, said wheel assembly pivoting about a substantially vertical axis, wherein contact between said at least one upstream roller and the endless drive member pivots said wheel assembly about said substantially vertical axis to maintain alignment between said wheel assembly and the endless drive member, said vertical axis being between said at least one upstream roller and said at least one downstream roller and closer to said at least one upstream roller.

50. The contact assembly of claim 49, wherein said at least one upstream roller has at least one end formed with an out-turned flange, wherein contact between said at least one out-turned flange and the endless drive member pivots said wheel assembly about said substantially vertical axis.

51. The contact assembly of claim 49, wherein said at least one upstream roller is a first pair of contact rollers and said at least one downstream roller is a second pair of contact rollers.

52. The contact assembly of claim 51, wherein the endless drive member has an undersurface formed with a protrusion projecting therefrom and positioned between said first pair of contact rollers and said second pair of contact rollers when said first pair of contact rollers and said second pair of contact rollers en gage the endless drive member.

53. The contact assembly of claim 52, wherein the protrusion has a width and each contact roller of said first pair of contact rollers and said second pair of contact rollers has an inner surface, at least one pair of said first pair of contact rollers and said second pair of contact rollers being spaced a preselected distance apart, wherein said preselected distance is slightly greater than the width of the protrusion so that contact between said inner surface of a contact roller and said protrusion pivots said wheel assembly about said substantially vertical axis.

54. The contact assembly of claim 53, wherein said first pair of contact rollers are spaced said preselected distance apart and positioned first in the direction of travel of the endless drive member.

55. The contact assembly of claim 54, wherein said first pair of contact rollers are spaced a first distance apart and said second pair of contact rollers are spaced a second distance apart, wherein said second distance is greater than said first distance.

56. The contact assembly of claim 49, wherein said support member has a horizontal surface and at least one guide member extending from said horizontal surface, said wheel assembly pivoting about said at least one guide member.

57. The contact assembly of claim 56, wherein said wheel assembly is formed with at least one post, said at least one post having a channel dimensioned to receive said at least one guide member.

58. The contact assembly of claim 57, wherein said at least one guide member is a first guide member and a second guide member, and wherein said at least one post is a first post and a second post, said first post having a first channel dimensioned to receive said first guide member, said first post positioned proximate to said first pair of contact rollers, said second post having a second channel dimensioned to receive said second guide member, said second post positioned proximate to said second pair of contact rollers.

59. The contact assembly of claim 58, wherein said first channel has a first diameter, wherein said second channel has a second diameter, said second diameter being greater than said first diameter.

60. The contact assembly of claim 49, wherein said support member is formed with an orientation member.

61. An accumulation conveyor comprising:
a plurality of conveying rollers and an endless drive member juxtaposed with said plurality of conveying rollers, said endless drive member formed with an undersurface having a protrusion extending therefrom, said protrusion having a width, said endless drive member traveling in a direction;
a support member, said support member having a horizontal surface and at least one guide member extending from said horizontal surface;
a force-producing device carried by said support member; and
a wheel assembly positioned between said force-producing device and said endless drive member and supported by said support member, said wheel assembly rotatably positioned on said at least one guide member to rotate about a generally vertical axis, said wheel assembly having a first pair of contact rollers and a second pair of contact rollers, said first pair of contact rollers positioned first in said direction of travel of said endless drive member, each contact roller of said first pair of contact rollers having an inner surface, wherein actuation of said force-producing device moves said first pair of contact rollers and said second pair of contact rollers into engagement with said endless drive member and said endless drive member into engagement with said conveying rollers, wherein said protrusion is positioned between said first pair of contact rollers and said second pair of contact rollers when said first pair of contact rollers and said second pair of contact rollers engage said endless drive member, and wherein said first pair of contact rollers are positioned a preselected distance apart, said preselected distance being slightly greater than said width of said protrusion such that contact between an inner surface of a contact roller of said first pair contact rollers and said protrusion pivots said wheel assembly to thereby maintain alignment between said wheel assembly and said endless drive member.

62. The accumulation conveyor of claim 61, wherein said wheel assembly is formed with at least one post, said at least one post having a channel dimensioned to receive said at least one guide member.

63. The accumulation conveyor of claim 62, wherein said at least one guide member is a first guide member and a second guide member and wherein said at least one post is a first post and a second post, said first post having a first channel dimensioned to receive said first guide member, said first post positioned proximate to said first pair of contact rollers, said second post having a second channel dimensioned to receive said second guide member, said second post positioned proximate to said second pair of contact rollers, said wheel assembly pivoting about said first guide member when said protrusion contacts an inner surface of a contact roller of said first pair of contact rollers.

64. The accumulation conveyor of claim 63, wherein said first channel has a first diameter, wherein said second channel has a second diameter, said second diameter being greater than said first diameter.

65. An accumulation conveyor comprising:
- a plurality of conveying rollers and an endless drive member juxtaposed with said conveying rollers, an upper portion of said endless drive member traveling in a plane;
- at least one sensor for sensing that said endless drive member is misaligned in said plane; and
- at least one contact assembly operably interconnected with said at least one sensor, said at least one contact assembly selectively reciprocally movable into engagement with the endless drive member to bring the endless drive member into selective engagement with the conveying rollers, said at least one contact assembly including a portion that is moveable in said plane in response to said at least one sensor sensing that said endless member is misaligned in said plane.

66. The accumulation conveyor of claim 65, wherein said at least one contact assembly is configured to move into alignment with said endless drive member when said at least one sensor senses that said endless drive member is misaligned in said plane.

67. The accumulation conveyor of claim 66, wherein movement of a portion of said contact assembly into alignment with the endless drive member displaces another portion of said contact assembly in a manner which moves the endless drive member into alignment with said contact assembly.

68. The accumulation conveyor of claim 67, wherein said portion is upstream of said another portion with respect to the movement of said endless drive member.

69. The accumulation conveyor of claim 65, wherein said contact assembly is configured to pivot about a substantially vertical axis.

* * * * *